US012693852B2

(12) United States Patent
Islam et al.

(10) Patent No.: US 12,693,852 B2
(45) Date of Patent: Jul. 28, 2026

(54) SYSTEMS AND METHODS FOR REMOTE CODE REVIEW

(71) Applicants: Atlassian Pty Ltd., Sydney (AU); Atlassian Inc., San Francisco, CA (US)

(72) Inventors: Zakiul Islam, Sydney (AU); Noah Wasmer, Sydney (AU)

(73) Assignees: ATLASSIAN PTY LTD., Sydney (AU); ATLASSIAN US, INC., San Francisco, CA (US)

( * ) Notice: Subject to any disclaimer, the term of this patent is extended or adjusted under 35 U.S.C. 154(b) by 0 days.

(21) Appl. No.: 17/194,226

(22) Filed: Mar. 6, 2021

(65) Prior Publication Data

US 2021/0303297 A1 Sep. 30, 2021

(51) Int. Cl.

| | |
|---|---|
| ***G06F 9/44*** | (2018.01) |
| ***G06F 8/36*** | (2018.01) |
| ***G06F 8/71*** | (2018.01) |
| ***H04L 9/40*** | (2022.01) |

(52) U.S. Cl.

CPC .................. *G06F 8/71* (2013.01); *G06F 8/36* (2013.01); *H04L 63/083* (2013.01)

(58) Field of Classification Search

None

See application file for complete search history.

(56) References Cited

U.S. PATENT DOCUMENTS

| | | | | |
|---|---|---|---|---|
| 7,752,139 | B2 * | 7/2010 | Hu | G06F 21/10 717/102 |
| 9,135,146 | B1 * | 9/2015 | Allen | G06F 11/0706 |
| 9,430,229 | B1 * | 8/2016 | Van Zijst | G06F 9/3844 |
| 10,180,836 | B1 * | 1/2019 | Arguelles | G06F 8/73 |
| 10,782,937 | B2 * | 9/2020 | Pezaris | G06F 8/33 |
| 10,877,869 | B1 * | 12/2020 | Nair | G06Q 10/06 |
| 2002/0108060 | A1 * | 8/2002 | Takamoto | H04L 63/083 709/217 |
| 2004/0068715 | A1 * | 4/2004 | Wong | G06F 9/4862 717/136 |
| 2004/0139052 | A1 * | 7/2004 | Kazushige | H04L 9/40 |
| 2011/0125829 | A1 * | 5/2011 | Finley | G06F 16/972 709/203 |
| 2013/0290334 | A1 * | 10/2013 | Kapoor | G06F 3/067 707/E17.089 |
| 2014/0006351 | A1 * | 1/2014 | Laitkorpi | G06F 16/184 707/634 |
| 2014/0196010 | A1 * | 7/2014 | Balachandran | G06F 8/70 717/124 |
| 2014/0279823 | A1 * | 9/2014 | Wang | G06Q 10/06 707/600 |
| 2015/0199185 | A1 * | 7/2015 | Saff | G06F 8/30 709/225 |

(Continued)

*Primary Examiner* — Lanny N Ung

(74) *Attorney, Agent, or Firm* — Brownstein Hyatt Farber Schreck, LLP

(57) ABSTRACT

Described herein is a computer implemented method including a server system communicating identifier(s) identifying to a document management service of a second server system a portion of software code or other document parts. The identified code or document parts are communicated to a client system. A variation of or addition to the code or document is received from the client system and the server system communicates to the document management service the variation and the identifier(s).

20 Claims, 6 Drawing Sheets

(56) References Cited

U.S. PATENT DOCUMENTS

| | | | | |
|---|---|---|---|---|
| 2016/0080217 | A1* | 3/2016 | McHardy | G06F 11/3409 709/224 |
| 2017/0220657 | A1* | 8/2017 | Nivala | G06F 16/27 |
| 2018/0253296 | A1* | 9/2018 | Brebner | G06F 8/73 |
| 2019/0004925 | A1* | 1/2019 | Buckingham | G06Q 10/101 |
| 2019/0007409 | A1* | 1/2019 | Totale | H04L 9/3247 |
| 2019/0213355 | A1* | 7/2019 | Raviv | G06F 16/901 |
| 2020/0005219 | A1* | 1/2020 | Stevens | G06F 8/71 |
| 2020/0341755 | A1* | 10/2020 | Woulfe | G06Q 10/063112 |
| 2021/0058447 | A1* | 2/2021 | Trufasiu | H04L 67/06 |

* cited by examiner

200

Associate a SaaS task with one or more code section identifiers — 201

Provide, to a client system, a SaaS user interface for task management — 202

Receive, from the client system, a task and code selection association request — 204

Receive, from the client system, one or more code identifiers associated with the task (identify location of code repository and location within repository of code) — 206

Associate the task with the one or more code identifiers — 208

Create a user SaaS session for accessing code — 203

Receive, from a client system, a user request for a SaaS service and user credentials — 212

Determine user eligibility — 214

Provide, to the SaaS user client system, a SaaS user interface — 216

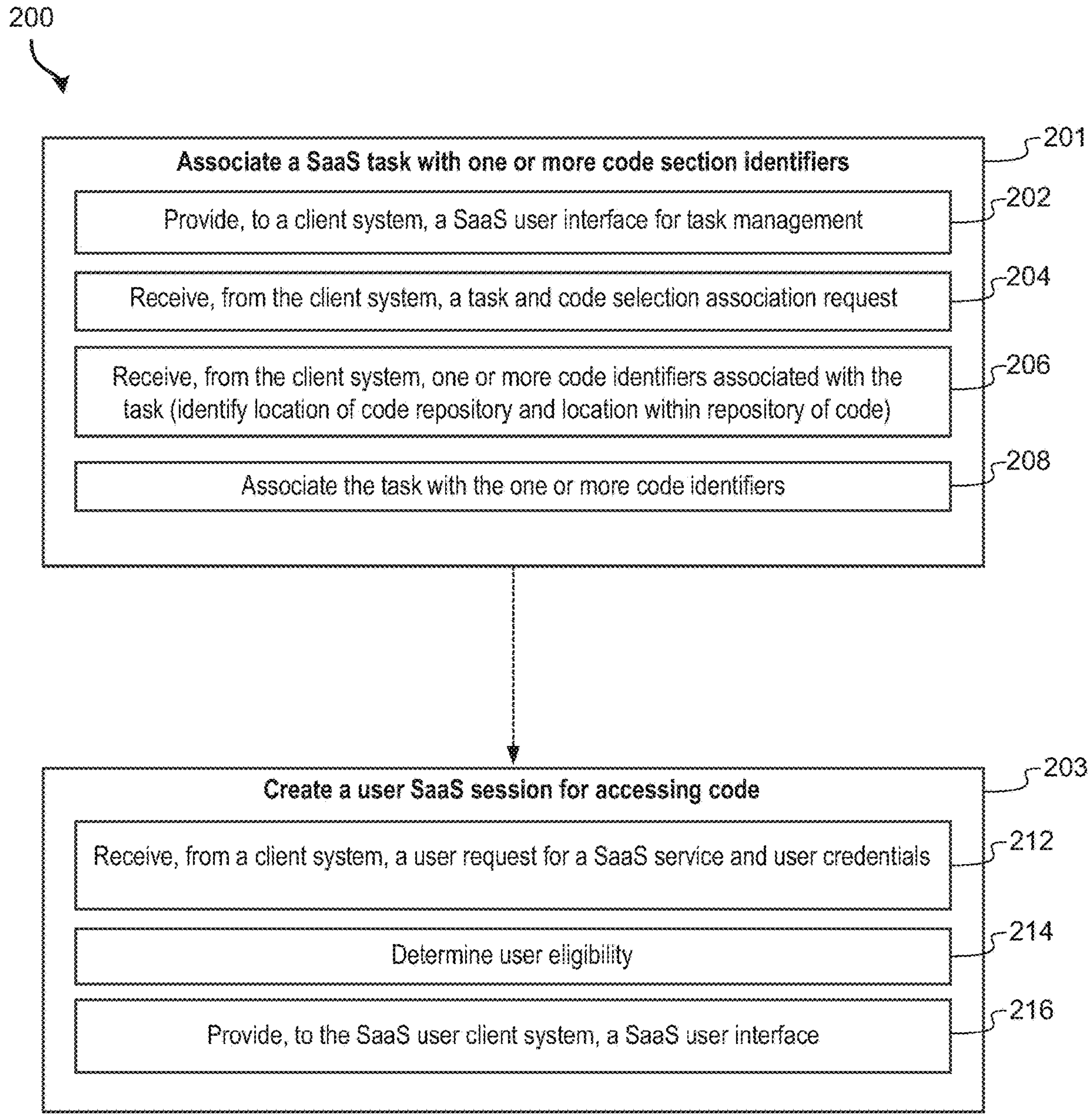

Fig 2

SYSTEMS AND METHODS FOR REMOTE CODE REVIEW

CROSS-REFERENCE TO RELATED APPLICATION(S)

This application claims the benefit of Australian patent application no. AU2020900943, filed Mar. 27, 2020 and titled "Systems and Methods for Remote Code Review," the disclosure of which is hereby incorporated herein by reference in its entirety.

FIELD

The present disclosure is directed to systems and methods for source code management, including systems and methods for communicating and updating a code repository.

BACKGROUND

Various technologies are provided to assist with source code management. Some of these technologies facilitate effective management of the storage, retrieval and revision of a repository of code. One example is the open source distributed version control system Git. Some technologies may be adapted to particular one or more programming languages and provide features based on and dependent on use of a supported language. Other technologies provide features, such as version control and recording the history of development, that are substantially independent of the underlying code and which may extend to other data, for example documents.

An example implementation of a source code management system includes setting up a server to manage requests. Administrator and developer user accounts are established, with appropriate security, to provide authorised access to the repository. One or more repositories are also created, for example each repository being associated with a particular project. Other users may then access and update the repository content.

Source code management technologies may form only part of a development solution. Example other available technologies include agile tools for project or work flow management and collaboration tools to facilitate effective team work on the development project.

Background information described in this specification is background information known to the inventors. Reference to this information as background information is not an acknowledgment or suggestion that this background information is prior art or is common general knowledge to a person of ordinary skill in the art.

SUMMARY

A computer implemented method is described, the method including, at a first server system providing one or more software services to one or more users, including a first user associated with a second server system different to the first server system and providing a document management service that includes storage and retrieval in a storage and retrieval system of a plurality of document objects: responsive to a first incoming client communication received by the first server system from a client system operated by the first user, communicate to the second server system a first outgoing server communication comprising a first identifier of at least one object maintained by the document management service, the at least one object comprising less than all of a document formed in part by the at least one object; receive, from the second server system, a first incoming server communication including content of the at least one object; communicate, to the client system, a first outgoing client communication including the content of the at least one object; receive from the client system, a second incoming client communication including varied content, the varied content comprising the content of the at least one object with one or more variations or additions; communicate, to the second server system, a second outgoing server communication including the varied content and the first identifier.

In some embodiments the first incoming client communication is part of functionality provided by the one or more software services provided to the client system by the first server system. The method may further include determining that the first user is associated with the second server system, based on credentials provided by the first user and a user account of the one or more software services, wherein communicating to the second server system the first outgoing server communication is dependent on the determination.

In some embodiments providing one or more software services comprises providing a service managing a plurality of tasks, including a first task and a second task different to the first task, the first task is associated with the first identifier and the second task is associated with a second identifier that identifies to the document management service one or more different objects maintained by the document management service to the at least one object identified by the first identifier, the first incoming client communication is associated with the first task and not the second task and the first outgoing server communication does not include the second identifier.

In some embodiments the first outgoing server communication and the first incoming server communication are communications between proxy applications respectively provided on the first server system and the second server system, wherein the proxy application of the first server system communicates the content of the at least one object to one or more applications providing the one or more software services. In some embodiments the first incoming client communication, second incoming client communication and first outgoing client communication are not communicated between the proxy applications.

In some embodiments the document management service maintains a software code repository and the content of the at least one object is software code.

In some embodiments the varied content comprises an addition, the addition including metadata indicating an action to be performed by the document management service.

In some embodiments the document management service maintains a software code repository and the content of the at least one object is software code and wherein the varied content comprises an addition, the addition comprising at least one of a comment to the software code and metadata indicating an action to be performed by the document management service in relation to the software code.

In some embodiments the method further includes determining, by at least one of the first server and the second server, that the content to be provided in the first incoming server communication is less than a threshold amount of content, wherein communication of the first incoming server communication is dependent on the determination.

Another computer implemented method is described, which in some embodiments is used together with the method described in the preceding paragraphs, the method including: causing, by a first server system, provision of a software service to a user of a client system in communication with the server system, the provision of the software service comprising causing the display, at the client system of a user interface, wherein the user interface comprises a first screen display including a first region displaying information maintained by the server system for the software service and a second region displaying a document part received by the first server system from a second server system; receiving, by the first server system from the client system, first user input indicating a variation of the part of a document displayed in the second region and causing the client system to display an updated document part including the variation; receiving, by the first server system from the client system, second user input different to the first user input, and in response communicating, by the first server system to the second server system the updated document part.

In some embodiments the first region and the second region are concurrently displayed in the first screen display.

In some embodiments the method includes displaying the first screen display responsive to selection of a selectable icon in a second screen display, the second screen display concurrently displaying with the selectable icon information maintained by the server system for the software service stored associated with one or more identifiers of the document part.

In some embodiments the document part received by the first server system from the second server system is received responsive to a request sent by the first server system to the second server system, the request including the one or more identifiers.

In some embodiments the document part comprises software code and the one or more identifiers comprise a first identifier of an object containing the software code.

A computer processing system is described, including: a first server system with one or more communication interfaces, one or more processing units and at least one non-transient computer-readable storage medium storing sequences of instructions, which when executed by the one or more processing units configure the one or more processing units to provide a software service to a user operating a client system and to send and receive communications to and from a second server system maintaining a code repository comprising a plurality of distinct code objects. The communications comprise: a first communication to the second server system comprising at least one identifier of a code object in the code repository; and then a second communication from the second server system comprising the code object identified by the at least one identifier; and a third communication to the second server system comprising a varied code object and the at least one identifier of the code object. The software service comprises causing display of the code object at the client system and providing the user with an interface for varying the code object and creating the varied code object.

In some embodiments the code object is a Git object.

In some embodiments the first server system includes a component for the creation and maintenance of the user accounts, including an account of the first user and for controlling the permission of the first user to cause the first to third communications.

In some embodiments the software service comprises: associating task information with the at least one identifier; and sending the first communication responsive to a communication of predetermined user input by the client system while causing the client system to display the task information to the user.

The computer processing system may implement an embodiment of the methods described in this section.

BRIEF DESCRIPTION OF THE DRAWINGS

FIGS. 2 and 3 provide a flowchart depicting operations involved in creating an integration between two systems, which each may form part of the system of FIG. 1.

Figure 1:
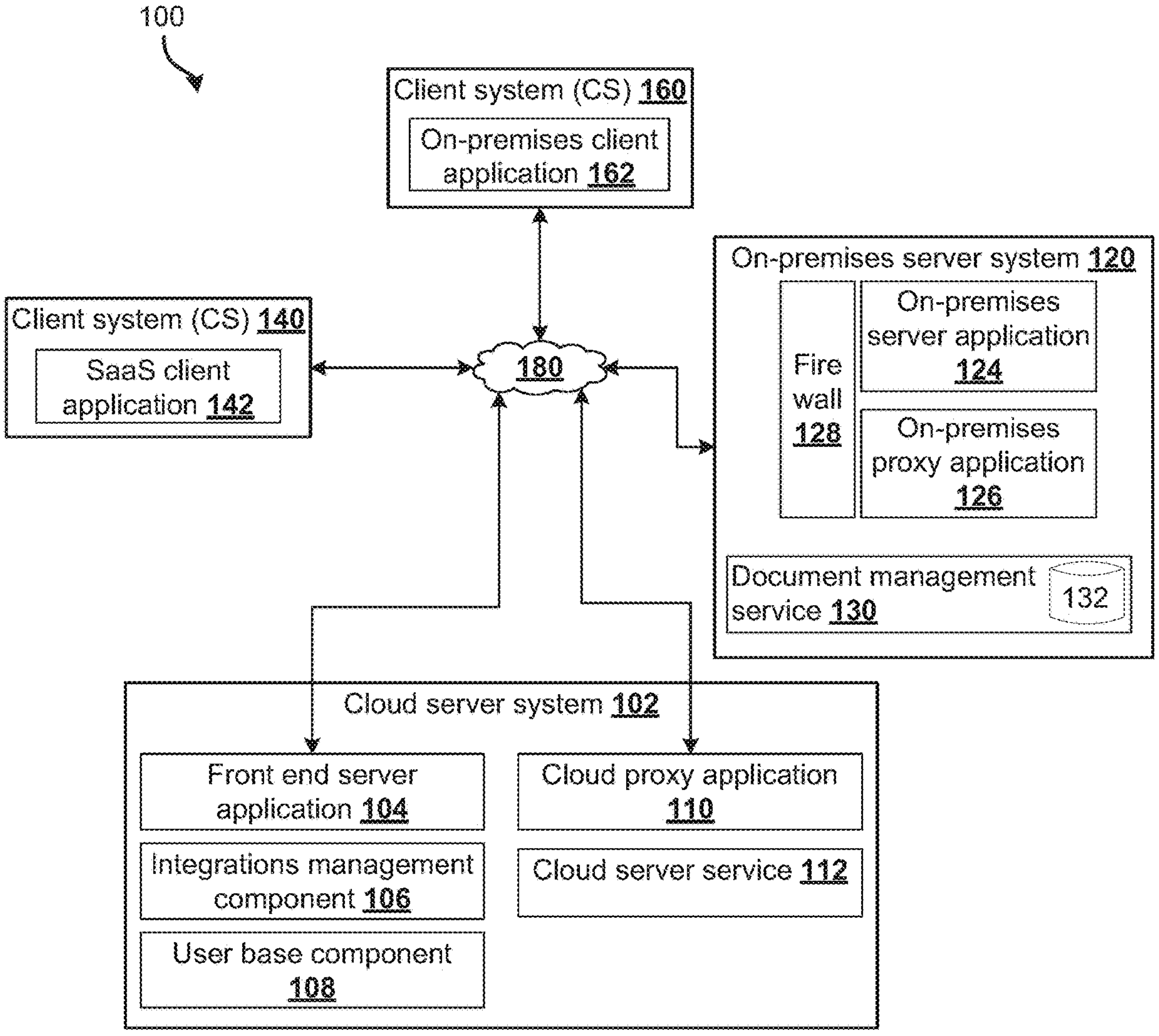
FIG. 1 is a diagram depicting a system configured to perform operations in accordance with certain embodiments of the present disclosure.

While the invention as claimed is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the scope of the present invention as defined by the appended claims.

DETAILED DESCRIPTION

In the following description numerous specific details are set forth in order to provide a thorough understanding of the claimed invention. It will be apparent, however, that the claimed invention may be practiced without these specific details. Additionally, various functional components provided by devices are described herein using a block diagram representation. The selection of this form of explanation does not and is not intended to limit the disclosure to a particular mode or method of configuring a device to provide the functionality.

The code and other documents produced by an organisation can form a substantial part of the intellectual property of the organisation. At the same time, access to the information must be provided to a development team, to allow the organisation to continue to develop its products and services. Development teams therefore often access a secure server and associated data repository, for example a Git repository, controlled by the organisation. The server in this instance may be referred to as "on-premises".

Several software as a service (SaaS) solutions are now available to developments teams to facilitate their operations, which solutions typically involve a server system managed by a third entity that is "cloud" accessible. Often these solutions provide functionality that the organisation cannot or does not wish to provide with on-site solution that they have to install and maintain. One option is to adopt a cloud solution for an organisation's Git repository.

For at least some organisations, the inventors have recognised a requirement for on-site control of the code and/or documentation of a project, combined with a desire to utilise SaaS solutions for the project. The inventors have also recognised a problem managing and integrating a cloud SaaS offering with an on-site server solution.

While embodiments of the present disclosure have been developed with reference to this background, the disclosure also extends to embodiments that integrate software services are provided by two organisation controlled on-premises server systems or by two cloud server systems. For example, while the example embodiments described herein below refer to integration and inter-operability of an organisation controlled server system and a cloud server system, other embodiments may provide integration and inter-operability between two on-premises systems or two cloud server systems.

FIG. 1 depicts one example of a networked environment 100 in which network components have been configured to perform operations and techniques of embodiments described herein. The networked environment 100 includes a cloud server system 102, an on premises server system 120, and two client systems 140 and 160. These systems are interconnected via a public/untrusted communications network 180 (e.g. the Internet).

The on premises server system 120 provides, or provides access to, a document management service 130. For example the on-premises system 120 may communicate with the document service 130 over a private communications network, located behind a firewall 128 implemented by the on-premises system 120. The document management service may for example, include or consist of a source code management service with an associated code repository 132 implemented within suitable data storage. Using Git as an example, the on premises server system 120 provides an interface by which commands are provided to act on a repository, for example to add file contents to a repository index, to create or delete repository branches, to record changes to the repository, to add an object note to the repository. It will be appreciated that there are many other example commands that may be applied.

The document management service 130 may implement version control for code in the repository 132. For example, the version control may include “locking” a section of code when it has been communicated for an editing function and unlocking the code section when updated code is committed back to the repository. Alternatively, the version control may implement a rules approach, for example the most recent overwrite wins. The on-premises proxy application 126 may be configured to receive notifications from the document management service 130 and to provide to the cloud server system 102 the notifications or a signal based on the notifications. The cloud server system 102 may then provide suitable notifications to a user of the cloud server service 112. For example, where an activity of the cloud server service 112 requires a code review of code from the document management service 130, a notification may be communicated and provided to the user if the code is indicated as currently being reviewed by another user, either of the cloud server service 112 or otherwise, for example a user of the on-premises client application 162.

The on premises server system 120 implements an on-premises server application 124. The on-premises server application 124 may serve requests, for example from a client system 160, for remote access to the document management service 130. For example a user of client system 160 may, at an on-premises client application 162, provide commands to the document management service 130, such as the Git commands described above, or other commands such as a command to clone a repository, create a new repository or export part of a repository. Accordingly, one or more user interfaces of the document management service 130 are provided via the on-premises server application 124. In some embodiments the functions of the on-premises server application 124 are integrated into the document management service 130.

The on-premises server system 120 also implements an on-premises proxy application 126. The on-premises proxy application 126 is configured to operatively communicate with a corresponding cloud proxy application 110 of the cloud server system 102. The proxy applications 110, 126 communicate over a communication pipe, which includes appropriate security by, for example, data encryption and/or creating a virtual private network between them. The on-premises proxy application 110 may also be behind the firewall 128. As described in more detail herein below, the proxy applications 110, 126 provide the cloud server system 102 with an interface over which communications for operation of the document management service 130 are sent. Example communications include commands for the document management service 130 and/or commands that are acted on by the on-premises server system 120 to provide commands to the document management service 130. The communications may also include code retrieved from and code to be stored in the code repository 132.

The cloud server system 102 implements a front end server application 104. The front end server application 104 may serve requests, for example from a client system 140, for remote access to a cloud server service 112. The front end server application 104 may implement a web server. The front end server application 104 provides, via the network 180, server-side functionality to one or more corresponding client applications, for example a SaaS client application 142 executing on the client system 140. The cloud server service 112 may provide a SaaS solution. In some embodiments the cloud server service 112 may be integrated with the front end server application 104.

The cloud server system 102 also implements an integrations management component 106. The integrations management component 106 manages integration and inter-operability of the SaaS solution with the on premises server application 124. In particular, the SaaS solution provides one or more services in relation to activities that require use of the document management service 130. For example, the SaaS may be an issue tracking application in which issues relate to a software development project—e.g. issues may relate to bugs that require fixing, features that are to be implemented, and/or other software development related items. In this case, a given issue may relate to specific code maintained by the on premises server application 124. For example, the activities may include managing a project in relation to code maintained by the document management service 130, in which case the SaaS solution may provide project management functionality, including for example issue identification and tracking, resource, task and personnel allocation and prioritization and/or progress tracking. The SaaS solution may provide a continuous delivery pipeline to assist with project delivery, for example by managing activities such as code reviews, static analysis and software testing. The SaaS solution may also provide one or more services in relation to activities that do not require use of the document management service 130. For example, any of the activities mentioned above may be provided by the SaaS solution in relation to a code repository that is maintained by the cloud server system 102.

The integrations management component 106 cooperates with a user base component 108. The user base component 108 stores account details for the user accounts maintained by the cloud server system 102, at least in relation to user accounts for the cloud server service 112. When external applications or systems, for example SaaS client application 142 and on-premises proxy application 124 attempt to connect to or control the cloud server system 102 or control IS 102, they do so using a user account. The user base component 108 is responsible for validating user accounts and associated permissions. The integrations management component 106 includes an appropriate interface for the creation and maintenance of the user accounts.

The associated permissions for one or more user accounts may include permissions to access and utilise the cloud proxy application 110 for communication with the document management service 130, via the on-premises proxy application 126. The integrations management component 106 may therefore provide access control to the communication channel between cloud server system 102 and on-premises system 120, which may confirm authentication of each other using a suitable mechanism, for example in accordance with the OAuth 2.0 specification. Additionally or alternatively, the integrations management component 106 can receive from a user or retrieve on a user request from the user base component 108 credentials for the document service 130 as needed.

The cloud server system 102 will typically include additional components to those illustrated and described. As one example, cloud server system 102 will typically include one or more firewalls and/or other network security components and load balancers for managing access to the front end server application 104 and cloud proxy application 110. The cloud server system 102 may implement a queue for communications between it and the on-premises proxy application 126. For example, one or more first-in-first out queues may be implemented for incoming communications and outgoing communications.

In some embodiments, a computer processing system, for example the cloud server system 102, includes one or more communication interfaces, one or more processing units and at least one non-transient computer-readable storage medium storing sequences of instructions, which when executed by the one or more processing units configure the processing units to provide a software service to a user operating a client system and to send and receive communications to and from a second server system, for example the on-premises system 120, maintaining a code repository comprising a plurality of distinct code objects. A code request communication to the second server system includes at least one identifier of a code object in the code repository and then a code response communication from the second server system includes the code object identified by the at least one identifier. A code variation communication to the second server system includes a varied code object and the at least one identifier of the code object. The software service may include causing display of the code object at the client system and providing the user with an interface for varying the code object and creating the varied code object.

The integrations management component 106 creates and maintains the user accounts, including an account of the first user and for controlling the permission of the first user to cause the first to third communications.

To provide the server-side functionality, the front end server application 104 and the on-premises server application 124 include one or more application programs, libraries, APIs or other software elements that implement the features and functions that are described herein. For example, where the SaaS client application 142 or on-premises client application 162 is a web browser, the server application will be a web server such as Apache, IIS, nginx, GWS, or an alternative web server. Where the client application is a specific application, the server application will be an application server configured specifically to interact with that client application. Both web server and application server modules may be provided. Similarly, the cloud proxy application 110 and on-premises proxy application 126 include one or more application programs, libraries, APIs or other software elements that provide the communication pipe between them and the other functionality described herein.

While the SaaS client application 142 and on-premises client application 162 have been described as being on two separate systems, they may—and will often—be installed on a single client system. Additionally, a single application (e.g. a web browser or other application) may be installed to provide the functionality of both the SaaS client application 142 and on-premises client application 162. A permission system may control which users can perform which tasks, in the usual manner. Similarly, a client system may have multiple clients installed thereon to perform sub-parts of the functionality described herein.

While a single system pair has been shown in and described with reference to FIG. 1, including a single cloud server system 102 and a single on-premises system, the techniques described herein can be used to manage multiple integrations. There may instead be a one-to-many relationship or a many-to-many relationship. For example cloud server 102 may, under the management of the integrations management component 106, be integrated with any number of different on-premises systems 120, to receive and provide data from those systems. Similarly, content to and/or from the on-site document management service 130 may be provided to more than one cloud server system 102. In that case, each system pair may have a corresponding proxy application pair, or the respective proxy applications may be configured to provide a plurality of communication pipes. These may be deployed by the cloud server system 102 on an on-demand basis.

Figure 3:
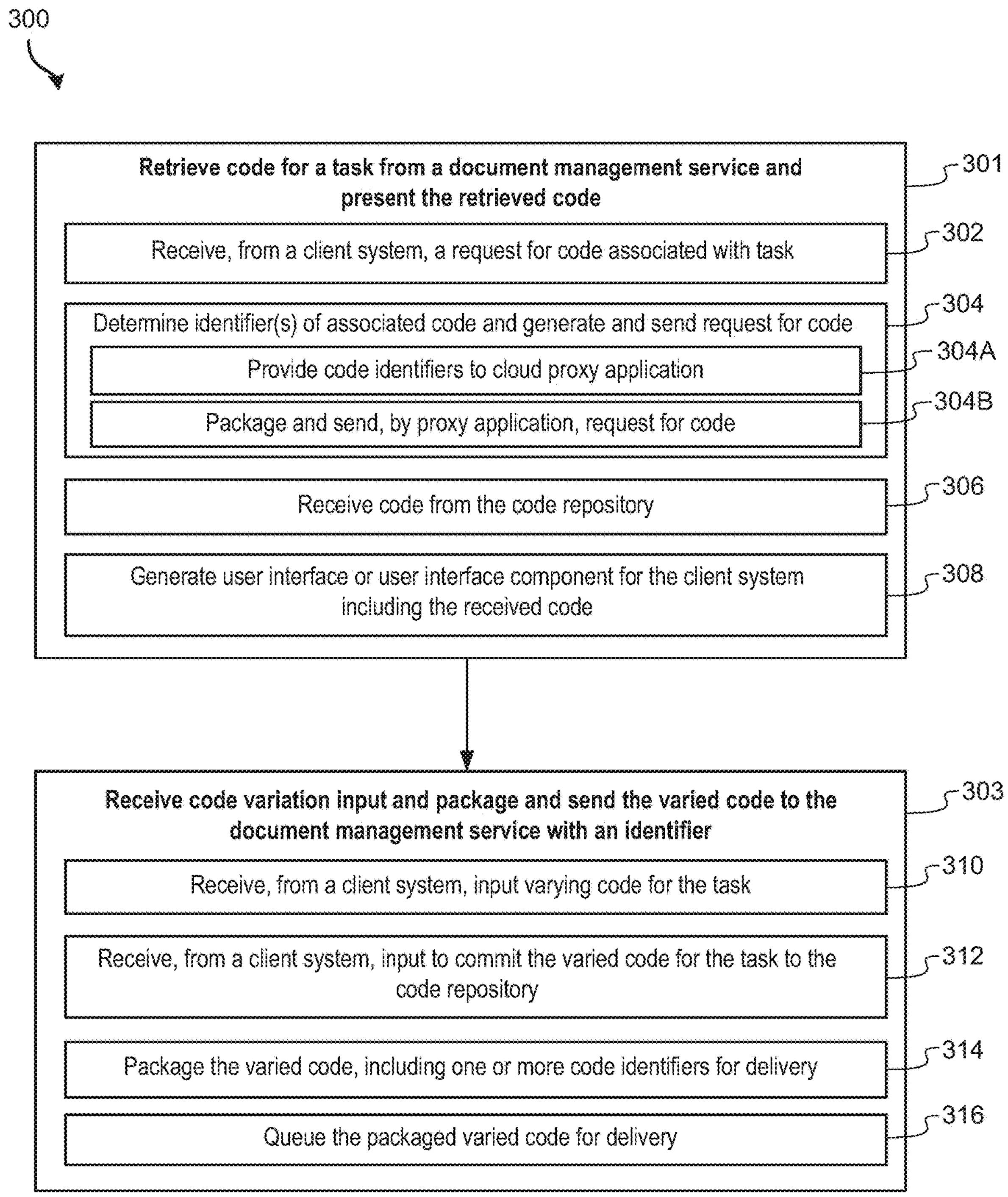

FIGS. 2 and 3 shows a flow chart of certain processes that may be performed by a server system. FIGS. 2 and 3 show only selected processes, for illustrating the methods of the present disclosure and omit known or routinely developed processes required for managing the computational systems involved in implementing the processes described.

FIG. 2 illustrates part of a process 200 for integrating a SaaS solution providing work flow management with an on-premises document management service. For example, the processes may be performed by the cloud server 102 of FIG. 1 in which the cloud server service 112 provides work flow management and the following description is made with reference to that example. An example of a SaaS cloud solution available on the filing date of the present application is Jira Cloud™ from Atlassian, Inc or Atlassian Pty Ltd.

In general, the process 200 includes a step 201 of the cloud server 102 creating an association between a SaaS task and one more code section identifiers for the database management service 130. An example task may be a request to review a section of code stored in the data repository 132. The task may be created responsive to a communication from a client system, for example the client system 140 or the client system 160.

In some embodiments in which a user operating the client system 140 requests a task, the process 201 commences with step 202. In step 202, the cloud server 102 communicates to the client system 140, via the network 180, data for providing a SaaS user interface at the client system 140 for managing one or more tasks relating to code at the code repository 132. In particular, the SaaS client application 142 and the cloud server service 112 cooperate to provide elements of the user interface. In some embodiments, the user interface for managing one or more tasks is preceded by user interface(s) that provided access to the SaaS in the usual manner, for example including a log-on process using a user name and password and/or other mechanisms. The cloud server 102 may verify or authenticate the user credentials for accessing the SaaS and/or for accessing code from the document management service 130 with reference to information in the user base component 108.

In steps 204 and 206, the cloud server 102 receives from the client system 140 a request to generate a task and associate that task with an identifier of code in the data repository 132 (or associate an existing task with an identifier of code in the data repository 132). For example, the user interface for managing tasks displayed in step 202 may include a field to input the nature of the task and a field to provide input that directly or indirectly specifies the identifier of code. The fields may be for example, fields on one or more webpages. The code identifier may in the case of a Git repository may be an identifier of an object stored in the repository, a commit identifier, a pull request identifier, or any other identifier.

In addition, or alternatively, tasks maintained by the cloud server 102 can be automatically associated with code identifiers via updates generated by and received from the on-premises system 120, for example by the on-premises proxy application 126 communicating with cloud proxy application 110. For example, the on-premises proxy application 126 can be configured to provide the code identifier responsive to operation by the user of the on-premises client application 162.

For example, the on-premises system 120 may be configured to associate source code (or parts thereof) with one or more tasks maintained by the cloud server system 102. Association of code with one or more tasks can be performed in various ways, for example by inclusion of one or more task identifiers in a commit message, a source branch name, a pull request title, and/or any other relevant action/event/data field provided by the on-premises system 120. In this case, when a relevant event involving source code that has been associated with one or more tasks occurs at the on-premises system 120 (e.g. a commit, a pull request, a merge request, an alternative event), the on-premises system 120 generates and sends an event communication to the cloud server system 102 which includes the code identifier and one or more associated task identifiers (and event data in respect of the event that has occurred). The cloud server system 102 can then associate the code identifier and event data with the or each task the event communication relates to.

In some embodiments the on-premises system 120 and/or the cloud server system associates with a task additional code to that of the code identifier or provides additional code beyond the stored association. Taking an example a task to review a line of code that was modified, then the additional code may be plus and minus 10 lines of code from the line of code that was modified. In some embodiments, in addition to the code of the task, other references are associated with the task, for example references to tests (unit or integration) that reference the block of code that was changed or in the case of a change to a method signature, references to other packages or files that reference the method (or function).

The on-premises client application 162 may be operated independently of the cloud server service 112 or may both may configured so that when a task is generated an option is provided to invoke the on-premises client application 162 in order to access the document management service 130 and provide the code identifier(s) for the task.

In step 208, the cloud server 102 associates the task with the code identifier(s) in memory. The task and code identifier(s) are then available for a user to access, which user may be the same user that created the task or a different user. The task in question may be associated with other information, including for example timing information such as when the task is due, priority information on the task, any ante-requisite or co-requisite tasks, permissions of what users may view the task, what users may complete the task or aspects of the task and what users may request code associated with the task.

In process 203, a user accesses a SaaS solution, which is configured to request code from an on-premises system. In some embodiments, completion of process 203 is after process 201, that is after one or more tasks maintained by the SaaS solution have been associated with source code portions. In other embodiments, process 203 is completed without an associated antecedent process 201, for example if the user wishes to use the SaaS solution to review code that has previously been associated with a task in the SaaS solution.

In step 212 of process 203, a user requests a SaaS service. Access to the service may be dependent on the user providing credentials. In step 214 the credentials are checked by the cloud server system 102 against records maintained by the user base component 108.

In step 216, when a user is determined to be authorised to use the SaaS service, a SaaS user interface is provided by the cloud server system 102, via the SaaS client application 142. The user interface includes a mechanism to selectively request or display code from the document management service 130. For instance, if a task has been set up in process 201, then the user interface may display details of the task and include with the details a selectable button, icon, menu item or other user interface element that, when selected, causes display of the code associated with the task. The details of the task may include some or all of the information associated with the task when it was generated. Alternatively or additionally, the SaaS user interface may include a mechanism to enter one or more code identifiers. Alternatively or additionally, the SaaS user interface may include a mechanism to invoke the on-premises client application 162 to obtain the code identifiers or the code itself. For example, the user may operate the on-premises client application 162 to access the document management service 130 and data repository 132 and pass, automatically or manually, the code identifier(s) or the relevant part of the code to the cloud server service 112.

FIG. 3 illustrates part of a process 300 for integrating a SaaS solution providing work flow management with an on-premises document management service. For example, the processes may be performed by the cloud server 102 of FIG. 1 in which the cloud server service 112 provides work flow management and the following description is made with reference to that example. An example of a SaaS cloud solution available on the filing date of the present application is Jira Cloud™ from Atlassian, Inc or Atlassian Pty Ltd. In some embodiments the process 300 is completed after the process 200. In other embodiments process 300 is not preceded by process 200.

In general, the process 300 includes a step 301 of the cloud server 102 retrieving a section of code from the document management service 132. As described above, the retrieval may be based on code identifier(s) previously provided to the cloud server service 112, based on code identifier(s) entered by the user or based on code identifier(s) received from the on-premises server application 124 or on-premises client application 162. Alternatively, the code may be received directly, for example by the on-premises server application 124 or on-premises client application 162 communicating the code to the cloud server service 112 via the cloud proxy application 110. For example, the on-premises client application 162 may be configured to provide a user interface enabling a request to create a task to be communicated to the cloud server system 102. In that case, one or more code identifiers may accompany the code, for use when varied code is provided back to the document management service 130, to facilitate the document management service 130 identifying what code in the code repository 132 is to be updated.

In step 302 of process 300, the cloud server service 112 receives a request to display code from the document management service 130 for a task. The request may be a request to display the task. In other words, displaying a request to display a task may include a request to display the code associated with the task. Alternatively, the request may be specific to the code. For example, displaying a task by the SaaS client application 142 may include displaying a selectable icon, and the request to display code is receiving input at the client system 140 selecting the selectable icon.

Responsive to the request to display code, in step 304 the cloud server service 112 determines the code identifier(s) associated with the task. A code request is generated and communicated by the cloud server system 102 to the on-premises system 120. For example, in step 304A the code identifier(s) are provided by the cloud server service 112 to the cloud proxy application 110. The cloud proxy application then, in step 304B, generates a code request for communication over the network 180 to the on-premises proxy application 126 that includes the code identifier(s).

The on-premises proxy application 126 is configured to receive the code request, and request from the document management service 130 code from the code repository 132 identified by the code identifier(s). The on-premises proxy application 126 is configured to communicate the returned code to the cloud proxy application 110.

In step 306 the cloud proxy application 110 receives the code from the on-premises proxy application 126 and in step 308, the cloud server service 112 generates a user interface that includes the code received from the on-premises proxy application 126. The user interface is provided to a user at a client system, for instance at the client system 140 by the SaaS client application 142. For example, the SaaS client application 142 may be a web browser and the code may be provided within a window on a web page provided by the front end server application 104. The SaaS client application 142 may provide on the web page information and/or links to information associated with the task or tasks for the provided code. In other words, the SaaS client application 142 may concurrently display both the code received from the document management service 130 and information provided by the cloud server service 112.

At one or more points within process 300, the cloud server system 112 and/or the on-premises server system 120 determines that the user is authorised, including in particular, authorised to view code from the document management service 130. Various authorisation mechanisms may be used. For example, authorisation may be based on one or more of: credentials provided to access the cloud server service 112; user permissions for accessing the on-premises server system 120 managed by the user base component 108; and/or credentials provided by a user as part of step 301 that are communicated to the on-premises server system 120.

The process 300 includes a step 303 of the cloud server 102 receiving input associated with the code and sending a communication to the document management service 130 based on the input. The example process of FIG. 3 is in relation to input that varies the code received in step 306 and displayed in step 308 (e.g. by adding new code, deleting existing code, or editing the code). The cloud server service 112 provides the user interface for receiving the input varying the code. The varied code is packaged for communication and communicated to the document management service 130 by the cloud proxy application 110. The document management service 130 then updates the code repository based on the received varied code. The code identifier (s) are packaged and sent with the varied code. The document management service 130 may then use the code identifier(s) to identify what section(s) of code are to be replaced or updated in the code repository 132.

In some embodiments process 303 includes step 310 in which the cloud server 102 receives, via the user interface provided in step 308, input varying code received from the document management service 130. The input may be provided over a period of time and include several actions to vary the code, which are collected and stored by the cloud server service 112. The user interface provided in step 308 includes a mechanism for a user to indicate a request to commit the varied code to the code repository 132. The mechanism may include a selectable button, icon, menu item or other user interface element that, when selected, causes a communication to the cloud server system 102 that is received by the cloud server system 102 (step 312) and interpreted as a request to commit the varied code to the code repository 132. The mechanism may be displayed concurrently with the code. The mechanism may be displayed concurrently with information from the cloud server service 112 associated with the code.

In step 314, responsive to the receipt of the input to commit the varied code, the cloud proxy application 110 is provided with the varied code and one or more identifiers that indicate where in the code repository 132 the varied code is to be stored. In some embodiments the cloud server 102 implements a queue for delivery of the varied code and the varied code and associated identifier(s) is provided to the queue for delivery (step 316). The queue may operate on a first-in-first-out basis, or on any other basis selected by the administrator or operator of the cloud server system 102. The queue may have particular application when there are many users of SaaS client application 142 and/or a plurality of on-premises systems like on-premises system 120 providing code for the cloud server service 112 and/or where there are a plurality of different cloud server services provided by the cloud server 102, each of which requires access to code from the one or more on-premises systems 120.

In some embodiments, the cloud server service 112 includes or is configured to invoke one or more services that test or check varied code before it is sent back to the on-premises system 120. For example, the cloud server service 112 may include or invoke static analysis on the code or testing of the code.

In some embodiments, the cloud server service 112 is configured to not persist data of documents from the document management service 130 in memory of the cloud server system 102. For example, document data may have an associated time-to-live (TTL) and at expiry of the designated time the document data is deleted by the cloud server system 102.

Figure 4:
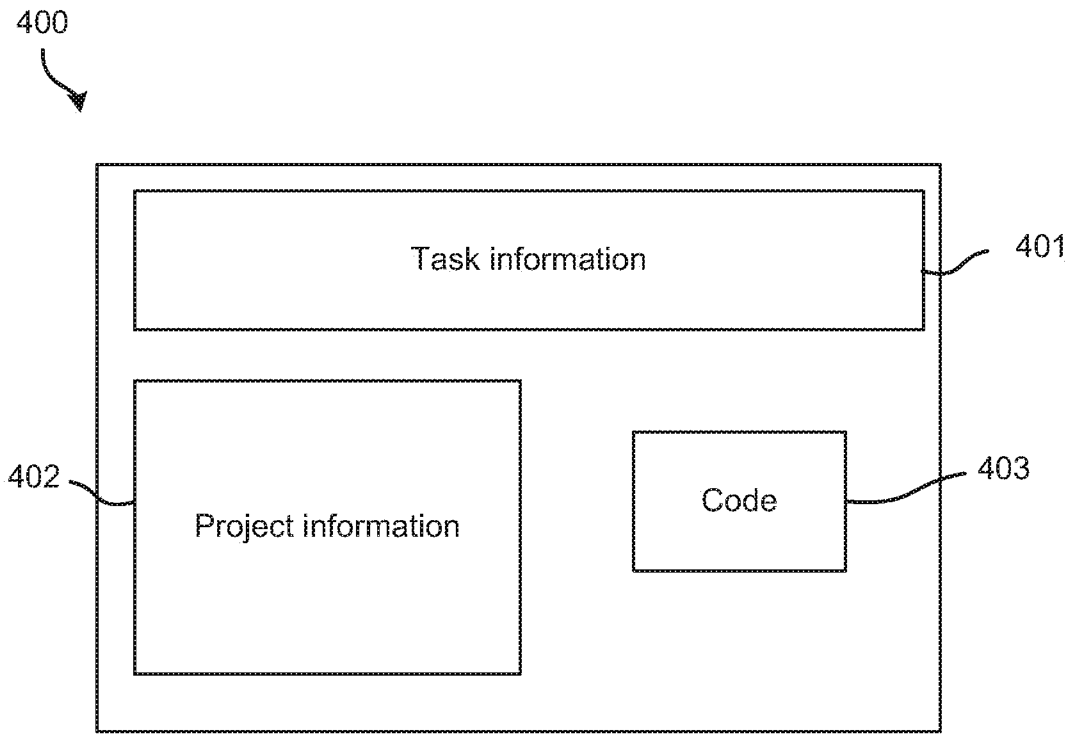
FIGS. 4 and 5 show example screen displays caused to be displayed by a system, for example the system of FIG. 1 or displayed during operations integrating two systems, for example as shown in FIGS. 2 and 3.

FIG. 4 shows an example screen display 400, which may form a part of a user interface provided by the SaaS client application 142. For example, the screen display 400 may be caused to be displayed at the SaaS client application 142 by the cloud server service 112 as part of step 216 of FIG. 2. The screen display 400 may be a web page provided by the front end server application 104. Information provided by the cloud server service 112 is provided in a first region 401 and/or a second region 402 of the screen display. By way of example the information in the first region 401 may relate to a task to be performed in relation to code in the code repository 132 and the information in the second region 402 may relate to the project that the task forms a part of. In some embodiments the information in the first region 401 is updated based on user interactions with information provided in the second region 402. The interactions may include, for example, navigating a plurality of tasks and selecting one of the tasks, with the information in the first region 401 reflecting the selected task. A selectable button or icon 403 is provided together with the task information. Selection of the icon 403 causes a request for code associated with the task information displayed in the first region 401. For example, selection of the icon 403 may send to the cloud server system 102 a request for code associated with the task, which request is received and acted on as per process 301 of FIG. 3.

Figure 5:
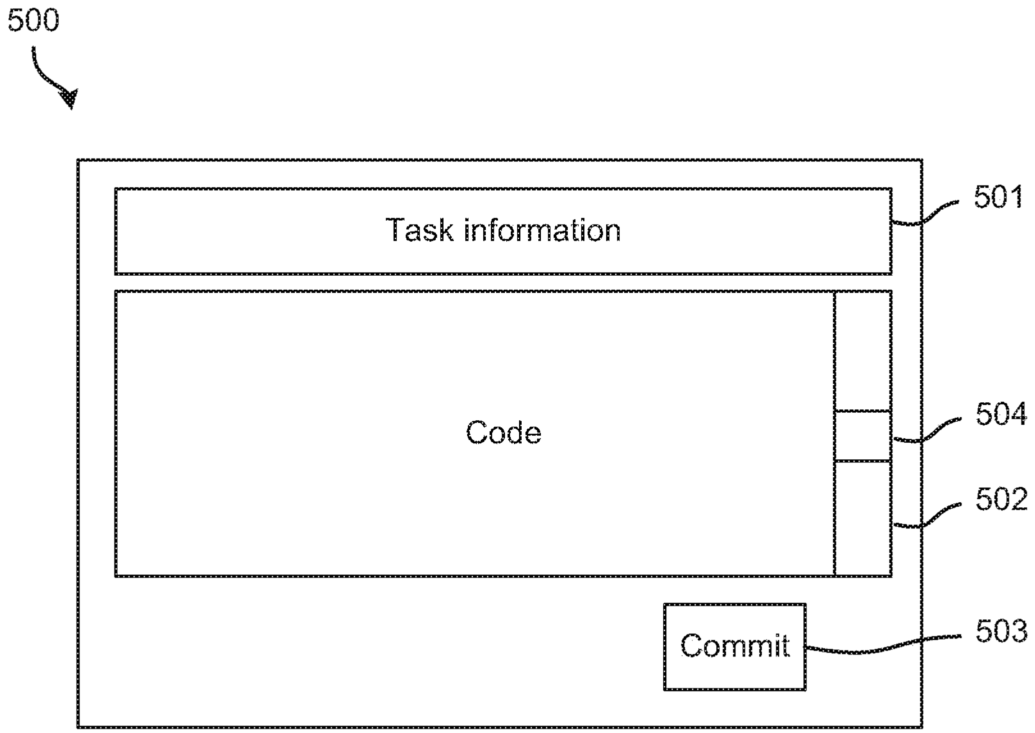

FIG. 5 shows an example screen display 500, which may form a part of a user interface provided by the SaaS client application 142. For example, the screen display 500 may be caused to be displayed at the SaaS client application 142 by the cloud server service 112 as part of one or more of steps 308 to 312 of FIG. 3. The screen display 500 may be a web page provided by the front end server application 104. Information provided by the cloud server service 112 is provided in a first region 501 of the screen display. Code received from the code repository 132 is displayed in a second region 502 of the screen display. As shown in FIG. 5, the task information and code may be concurrently displayed. The screen display 500 provides an interface for varying the code. For example region 502 may be a text editing field, populated by code received from the code repository 132 and by input received at the client system 140 executing the SaaS client application 142.

A selectable button or icon 503 is displayed concurrently with region 502. For example, selection of the icon 503 may send to the cloud server system 102 a communication which is interpreted and acted on as an input to commit varied code to the code repository 132, as per process 303 of FIG. 3.

Region 502 may include a navigation mechanism, to navigate through the code. For example a scroll bar 504 may be provided. Other regions, including region 501, region 401 and/or region 402 may also include navigation mechanisms.

Figure 6:
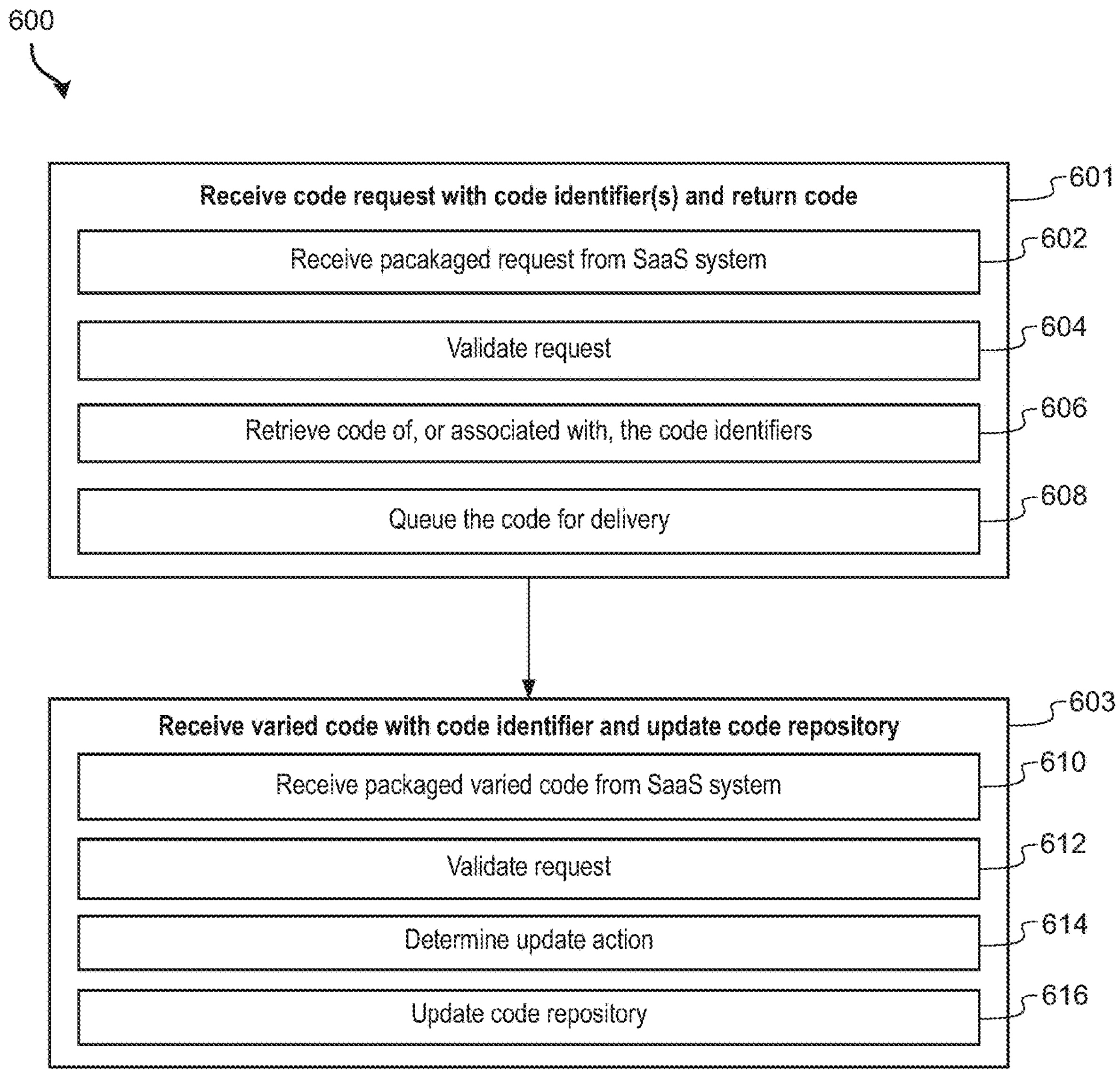
FIG. 6 provides a flowchart depicting operations for integrating a SaaS solution having an on-premises document management service.

FIG. 6 shows a flow chart of certain processes that may be performed by a server system. FIG. 6 shows only selected processes, for illustrating the methods of the present disclosure and omit known or routinely developed processes required for managing the computational systems involved in implementing the processes described.

FIG. 6 illustrates part of a process 600 for integrating a SaaS solution providing work flow management with an on-premises document management service. For example, the processes may be performed by the on-premises server system 120 of FIG. 1 in which the on-premises server system 120 provides a document management service 130 integrated with the workflow management SaaS provided by the cloud server system 102. The following description is made with reference to that example.

In general, the process 600 includes a step 601 of the on-premises server system 120 receiving a code request with one or more code identifiers and returning the requested code. The code request may have been sent in accordance with step 304 of FIG. 3. Process 600 also includes in step 603 receiving varied code with the one or more code identifiers and in response updates the code repository 132.

In some embodiments, step 601 includes the on-premises server system 120 receiving a packaged code request from the cloud server system 102. The request may be communicated to the on-premises proxy application 126, from the cloud proxy application 110 (step 602). After receiving the request and before returning requested code, in step 604 the on-premises server system validates the code request. Validation may be at a system level (e.g. the cloud server system 102 is authorised to make the request), at a user level (e.g. the packaged request includes user identification and/or user credentials), and/or at a code level (e.g. the document management service 130 maintains authorisations for different parts of the code in the code repository 132). When the request has been validated, in step 606 the on-premises server system 120 retrieves the identified code from the code repository 132 and in step 608 queues the code for delivery to the cloud server system 102. In some embodiments in step 606 the on-premises server system 120 retrieves additional code to the identified code and/or additional references related to the identified code. For example, the on-premises server system 120 may be configured to request code sections (e.g. an additional ten lines of code) immediately preceding and/or immediately following the requested code, references to tests (unit or integration) that reference the block of code that was changed or in the case of the identified code being a method signature, references to other packages or files that reference the method (or function). The on-premises server system 120 may implement one or more rules in determining any additional code.

In some embodiments step 603 includes steps 610 to 616. In step 610, a variation request is received, including the varied code and its associated identifier(s), which may for example have been sent in accordance with step 316 of FIG. 3. In step 612 the on-premises server system validates the varied code request, for example using the same validation mechanism as used in step 604 (which may be repeated or the validation determined in step 604 may be determined to still be in effect).

In step 614 an update action is determined based on the received variation request. The update action may be determined using one or more of a variety of mechanisms. In some embodiments the update action is included in the updated code. For example, instructions to the on-premises server system 120 may be included in the varied codes with a flag, tag or other indicator that the relevant code is instructions. The varied code may be parsed, for example by the on-premises proxy application 126 for these instructions and actions by the document management service 130 implemented in response to the instructions. In other examples, the packaged variation request includes instructions or other indicators of the action to be performed. In other examples an action may be completed automatically, either in every case, or in the absence of contrary instructions in or with the varied code. In step 616 the code repository 132 is updated by the document management system 130 in accordance with the determined action, for example by replacing the section of code with an updated section of code, accepting the section of code or rejecting the section of code.

Adopting a simple example for the purposes of illustration, one example of code sent and received in steps 601 and 301 may be:

<data>
This is a line of code.
This is another line of code.
And another one.
</data>

The code is associated with a task. For example the task may be to approve source code revisions and the lines of code above may have been developed by a team member of the user and submitted for approval, using the cloud server service 112 and process 201. The approver may use the cloud server service 112 (e.g. by process 203) and access the task and the code (e.g. by process 301).

The approver may then use the interface of the cloud server service 112 to update the code, whether by editing/commenting the code, approving it, rejecting it, requiring it to be merged or included in a branch or other update action, and returning the updated code to the on-premises server system 120 (e.g. by process 303). The updating may be to the code itself and/or by associating a command with the code, for example by selecting a command in a user interface of the cloud server service 112.

One example of updated code is then:

<data>
This is a line of code.
This is <comment>another line of code <text="This is a comment"/></comment>.
And another one.
</data>

The on-premises server system 120, in particular and for example the on-premises proxy application 126 may parse the updated code, identify that it is data for the code repository 132 and update the code repository based on the code identifier(s) received with the updated code.

Another example of updated code is:

<data>
This is a line of code.
This is <comment>another line of code <text="This is a comment"/></comment>.
And another one.
<meta>
<action>Approved</action>
</meta>
</data>

In this example, in addition to updating the code with the comments, the on premises server system 120 completes an approve action. Examples of an approve action include closing out a pull request and changing the code into a different branch.

Another example of updated code is:

<data>
This is a line of code.
This is <comment>another line of code <text="This is a comment"/></comment>.
And another one.
<meta>
<action>Rejected</action>
<comment>Wrong branch</comment>
</meta>
</data>

In this example, in addition to updating the code with the comments, the on premises server system 120 completes a rejection action. An example of a rejection action is the sending of a notification to a user associated with the code, for example the user who proposed the change that has been reviewed and rejected.

Various features and techniques described herein are implemented using one or more computer processing systems.

For example, in networked environment 100 described above, client systems 140 and 160 are both computer processing systems (for example, personal computers, tablet/phone devices, or other computer processing systems). Similarly, the various functional components of cloud server system 102 are implemented using one or more computer processing systems (e.g. server computers or other computer processing systems), as are the various components of on-premises server system 120.

Figure 7:
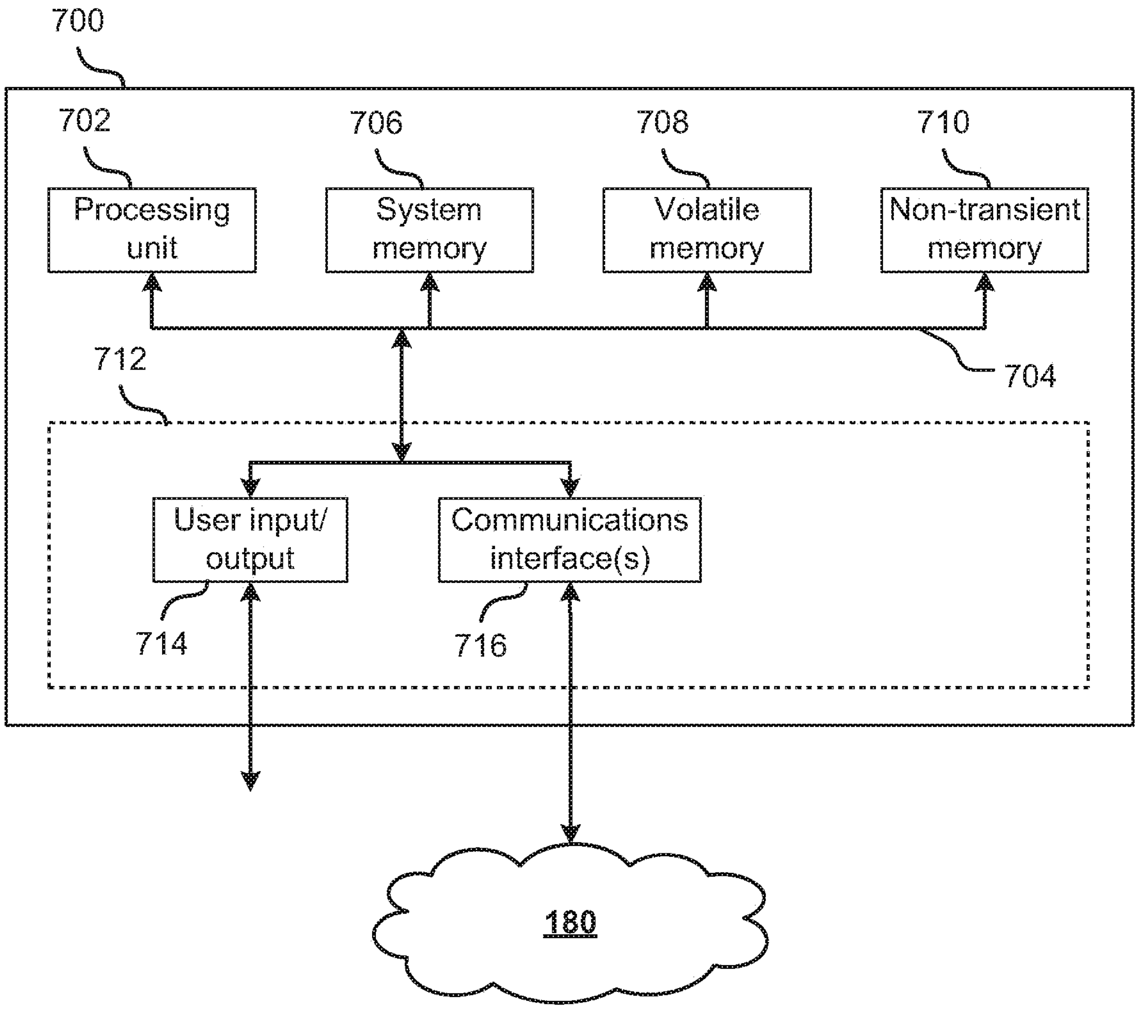
FIG. 7 is a block diagram of a computer processing system configurable to perform various features of the present disclosure.

FIG. 7 provides a block diagram of a computer processing system 700 configurable to implement embodiments and/or features described herein. System 700 is a general purpose computer processing system. It will be appreciated that FIG. 7 does not illustrate all functional or physical components of a computer processing system. For example, no power supply or power supply interface has been depicted, however system 700 will either carry a power supply or be configured for connection to a power supply (or both). It will also be appreciated that the particular type of computer processing system will determine the appropriate hardware and architecture, and alternative computer processing systems suitable for implementing features of the present disclosure may have additional, alternative, or fewer components than those depicted.

Computer processing system 700 includes at least one processing unit 702. The processing unit 702 may be a single computer processing device (e.g. a central processing unit, graphics processing unit, or other computational device), or may include a plurality of computer processing devices. In some instances, where a computer processing system 700 is described as performing an operation or function all processing required to perform that operation or function will be performed by processing unit 702. In other instances, processing required to perform that operation or function may also be performed by remote processing devices accessible to and useable by (either in a shared or dedicated manner) system 700.

Through a communications bus 704 the processing unit 702 is in data communication with a one or more machine readable storage (memory) devices which store instructions and/or data for controlling operation of the processing system 600. In this example system 700 includes a system memory 706 (e.g. a BIOS), volatile memory 708 (e.g. random access memory such as one or more DRAM modules), and non-volatile memory 710 (e.g. one or more hard disk or solid state drives).

System 700 also includes one or more interfaces, indicated generally by 712, via which system 700 interfaces with various devices and/or networks. Generally speaking, other devices may be integral with system 700, or may be separate. Where a device is separate from system 700, connection between the device and system 700 may be via wired or wireless hardware and communication protocols, and may be a direct or an indirect (e.g. networked) connection.

Wired connection with other devices/networks may be by any appropriate standard or proprietary hardware and connectivity protocols. For example, system 700 may be configured for wired connection with other devices/communications networks by one or more of: USB; FireWire; eSATA;

Thunderbolt; Ethernet; OS/2; Parallel; Serial; HDMI; DVI; VGA; SCSI; AudioPort. Other wired connections are possible.

Wireless connection with other devices/networks may similarly be by any appropriate standard or proprietary hardware and communications protocols. For example, system 700 may be configured for wireless connection with other devices/communications networks using one or more of: infrared; BlueTooth; WiFi; near field communications (NFC); Global System for Mobile Communications (GSM), Enhanced Data GSM Environment (EDGE), long term evolution (LTE), wideband code division multiple access (W-CDMA), code division multiple access (CDMA). Other wireless connections are possible.

Generally speaking, and depending on the particular system in question, devices to which system 700 connects-whether by wired or wireless means-include one or more input devices to allow data to be input into/received by system 700 for processing by the processing unit 702, and one or more output device to allow data to be output by system 700. Example devices are described below, however it will be appreciated that not all computer processing systems will include all mentioned devices, and that additional and alternative devices to those mentioned may well be used.

For example, system 700 may include or connect to one or more input devices by which information/data is input into (received by) system 700. Such input devices may include keyboards, mice, trackpads, microphones, accelerometers, proximity sensors, GPS devices and the like. System 700 may also include or connect to one or more output devices controlled by system 700 to output information. Such output devices may include devices such as a CRT displays, LCD displays, LED displays, plasma displays, touch screen displays, speakers, vibration modules, LEDs/other lights, and such like. System 700 may also include or connect to devices which may act as both input and output devices, for example memory devices (hard drives, solid state drives, disk drives, compact flash cards, SD cards and the like) which system 700 can read data from and/or write data to, and touch screen displays which can both display (output) data and receive touch signals (input).

System 700 also includes one or more communications interfaces 716 for communication with a network, such as network 180 of environment 100 (and/or a local network within the cloud server system 102 or on-premises server system 120). Via the communications interface(s) 716, the system 700 can communicate data to and receive data from networked devices, which may themselves be other computer processing systems.

System 700 may be any suitable computer processing system, for example, a server computer system, a desktop computer, a laptop computer, a netbook computer, a tablet computing device, a mobile/smart phone, a personal digital assistant, or an alternative computer processing system.

System 700 stores or has access to computer applications (also referred to as software or programs)—i.e. computer readable instructions and data which, when executed by the processing unit 702, configure system 700 to receive, process, and output data. Instructions and data can be stored on non-transient machine readable medium accessible to system 700. For example, instructions and data may be stored on non-transient memory 710. Instructions and data may be transmitted to/received by system 700 via a data signal in a transmission channel enabled (for example) by a wired or wireless network connection over interface such as 712.

Applications accessible to system 700 will typically include an operating system application such as Microsoft Windows®, Apple OSX, Apple IOS, Android, Unix, or Linux.

System 700 also stores or has access to applications which, when executed by the processing unit 702, configure system 700 to perform various computer-implemented processing operations described herein. For example, and referring to the networked environment of FIG. 100 above: client system 140 includes a SaaS client 142 and client system 160 includes an on-premises client 162, the clients configuring the client system 140 and 160 to perform the operations described herein.

In some cases part or all of a given computer-implemented method will be performed by system 700 itself, while in other cases processing may be performed by other devices in data communication with system 700.

The flowcharts illustrated in the figures and described above define operations in particular orders to explain various features. In some cases the operations described and illustrated may be able to be performed in a different order to that shown/described, one or more operations may be combined into a single operation, a single operation may be divided into multiple separate operations, and/or the function(s) achieved by one or more of the described/illustrated operations may be achieved by one or more alternative operations. Still further, the functionality/processing of a given flowchart operation could potentially be performed by different systems or applications.

Unless otherwise stated, the terms "include" and "comprise" (and variations thereof such as "including", "includes", "comprising", "comprises", "comprised" and the like) are used inclusively and do not exclude further features, components, integers, steps, or elements.

Unless otherwise stated, the terms "first", "second", "third" and so forth are used to indicate individual instances of the object or process referred to and are not used to indicate any required ordering, in time or otherwise.

It will be understood that the embodiments disclosed and defined in this specification extend to alternative combinations of two or more of the individual features mentioned in or evident from the text or drawings. All of these different combinations constitute alternative embodiments of the present disclosure.

The present specification describes various embodiments with reference to numerous specific details that may vary from implementation to implementation. No limitation, element, property, feature, advantage or attribute that is not expressly recited in a claim should be considered as a required or essential feature. Accordingly, the specification and drawings are to be regarded in an illustrative rather than a restrictive sense.

What is claimed is:

1. A client system comprising:

a memory allocation defined by:
- a data store of one or more executable assets; and
- a working memory allocation;

a processor allocation configured to load one or more executable assets from the data store into the working memory, wherein upon execution the one or more executable assets are configured to:
- operate a frontend issue tracking application and a frontend code application separate from the frontend issue tracking application;
- transmit, with respect to the frontend issue tracking application and to a cloud server system providing web-based access to a backend issue tracking system, an issue view request with respect to a particular issue hosted by the backend issue tracking system, wherein the issue view request is configured to cause a cloud proxy application of the cloud server system to communicate, over a secured communication pipe, with an on-premises proxy application of an on-premises server system;

receive, from the cloud server system in accordance with a time-to-live requirement and via the cloud proxy application:

issue data for the particular issue; and a set of code objects associated with the particular issue and communicated by the on-premises proxy application via the secured communication pipe from a code repository hosted by the on-premises server system;

display the set of code objects and the issue data in the frontend issue tracking application;

receive a user modification to at least one code object of the set of code objects via the frontend issue tracking application;

transmit, to the cloud server system, a code variation request comprising the user modification to the at least one code object of the set of code objects, wherein the code variation request is configured to cause the cloud proxy application to communicate with the on-premises proxy application via the secured communication pipe to trigger execution, at the code repository hosted by the on-premises server system, of an update action comprising the user modification to the at least one code object;

subsequent to transmitting the code variation request, transmit, with respect to the frontend code application and to the on-premises server system, a code view request with respect to the code repository;

receive, from the on-premises server system, at least a portion of the code repository, wherein the portion of the code repository includes the user modification to the at least one code object of the set of code objects; and display at least the portion of the code repository in the frontend code application operating in the client system.

2. The client system of claim 1, wherein upon execution the one or more executable assets are further configured to:

cause display, in the frontend issue tracking application, of a location identifier for the set of code objects indicating the on-premises server system and extracted from the issue data.

3. The client system of claim 1, wherein upon execution the one or more executable assets are further configured to:

cause display, in the frontend issue tracking application, of at least one of:

a commit identifier associated with the set of code objects;

a pull request identifier associated with the set of code objects; or an identifier of the code repository.

4. The client system of claim 1, wherein:

the frontend issue tracking application is operated in response to an authentication of first credentials provided by a user; and the issue view request is transmitted with respect to second credentials for the on-premises server system associated with the user.

5. The client system of claim 1, wherein the issue view request is transmitted in response to a user interaction with a particular task interface element corresponding to the particular issue displayed in the frontend issue tracking application.

6. The client system of claim 1, wherein displaying the set of code objects and the issue data in the frontend issue tracking application includes:

displaying project information extracted from the issue data in a first graphical region;

displaying issue information extracted from the issue data in a second graphical region; and displaying the set of code objects in a third graphical region configured to receive user inputs including the user modification to the at least one code object of the set of code objects.

7. The client system of claim 1, wherein:

each code object of the set of code objects corresponds to a respective code object identifier; and the issue data includes the respective code object identifiers.

8. The client system of claim 1, wherein:

the set of code objects are a set of Git objects; and the frontend code application is a Git application.

9. The client system of claim 1, wherein the backend issue tracking system includes a component for creation and maintenance of user accounts, including a user account for a user of the client system.

10. A method for modifying code objects hosted at an on-premises server system, the method comprising:

instantiating a frontend issue tracking application for issues corresponding to code objects modifiable in a frontend code application separate from the frontend issue tracking application;

transmitting, from the frontend issue tracking application and to a cloud server system providing web-based access to a backend issue tracking system, a first issue view request with respect to a particular issue hosted by the backend issue tracking system, wherein the first issue view request is configured to cause a cloud proxy application of the cloud server system to establish a secure communication pipe with an on-premises proxy application of the on-premises server system;

receiving, from the cloud server system in accordance with a time-to-live requirement and via the cloud proxy application:

issue data for the particular issue; and a set of code objects associated with the particular issue and sourced, via the on-premises proxy application using the secure communication pipe, from a code repository hosted by the on-premises server system;

causing display of the set of code objects and the issue data in the frontend issue tracking application;

receiving a user modification to at least one code object of the set of code objects via the frontend issue tracking application;

transmitting, to the cloud server system, a code variation request comprising the user modification to the at least one code object of the set of code objects, wherein the code variation request is configured to cause the cloud proxy application to communicate with the on-premises proxy application via the secure communication pipe to trigger execution, at the code repository hosted by the on-premises server system, of an update action comprising the user modification to the at least one code object;

subsequent to transmitting the code variation request, transmitting, with respect to the frontend issue tracking application and to the cloud server system, a second issue view request with respect to the particular issue;

receiving, from the cloud server system, a portion of the code repository including the user modification to the at least one code object of the set of code objects, the portion of the code repository sourced via a second secure connection with the on-premises server system established via the cloud proxy application; and causing display of at least the portion of the code repository in the frontend issue tracking application.

11. The method of claim 10 comprising:

causing display, in the frontend issue tracking application, of a location identifier for the set of code objects indicating the on-premises server system.

12. The method of claim 10 comprising:

causing display, in the frontend issue tracking application, of at least one of:

a commit identifier associated with the set of code objects;

a pull request identifier associated with the set of code objects; or an identifier of the code repository.

13. The method of claim 10 comprising:

prior to providing the frontend issue tracking application, authenticating first credentials provided by a user; and transmitting the first issue view request and the second issue view request with respect to second credentials for the frontend code application associated with the user.

14. The method of claim 10, wherein causing display of the set of code objects and the issue data in the frontend issue tracking application comprises:

causing display of project information extracted from the issue data in a first graphical region of the frontend issue tracking application;

causing display of issue information extracted from the issue data in a second graphical region; and causing display of the set of code objects in a third graphical region configured to receive user inputs including the user modification to the at least one code object of the set of code objects.

15. The method of claim 10, wherein the set of code objects includes at least one Git object.

16. The method of claim 10 comprising:

prior to causing display of the set of code objects and the issue data in the frontend issue tracking application, transmitting a lock request to the cloud server system, thereby causing the cloud server system to instruct the on-premises server system to lock the set of code objects in the code repository.

17. A method for modifying code objects hosted at an on-premises server system, the method comprising:

causing, on a client device, instantiation of a frontend issue tracking application for issues corresponding to code objects and instantiation of a frontend code application separate from the frontend issue tracking application;

transmitting, from the frontend issue tracking application and to a cloud server system providing web-based access to a backend issue tracking system, an issue view request with respect to a particular issue hosted by the backend issue tracking system, wherein the issue view request is configured to cause a cloud proxy application of the cloud server system to establish a secure communication pipe with an on-premises proxy application of an on-premises server system;

receiving, in accordance with a time-to-live requirement and from the cloud server system via the cloud proxy application:

issue data for the particular issue; and a set of code objects having identifiers associated with the particular issue and sourced, via on-premises proxy application using the secure communication pipe, from a code repository hosted by the on-premises server system;

causing display of the set of code objects and issue information extracted from the issue data in the frontend issue tracking application;

receiving a user modification to at least one code object of the set of code objects via the frontend issue tracking application;

transmitting, to the cloud server system, a code variation request comprising the user modification to the at least one code object of the set of code objects, wherein the code variation request is configured to cause the cloud proxy application to communicate with the on-premises proxy application via the secure communication pipe to trigger execution, at the code repository hosted by the on-premises server system, of an update action comprising the user modification to the at least one code object;

subsequent to transmitting the code variation request, transmitting, with respect to the frontend code application and to the on-premises server system, a code view request with respect to the code repository;

receiving, from the on-premises server system, at least a portion of the code repository, wherein the portion of the code repository includes the user modification to the at least one code object of the set of code objects; and causing display of at least the portion of the code repository in the frontend code application.

18. The method of claim 17, wherein causing display of the set of code objects and the issue data in the frontend issue tracking application comprises:

causing display of project information extracted from the issue data in a first graphical region of the frontend issue tracking application;

causing display of issue information extracted from the issue data in a second graphical region; and causing display of the set of code objects in a third graphical region configured to receive user inputs including the user modification to the at least one code object of the set of code objects.

19. The method of claim 18 wherein the code variation request is transmitted in response to receiving a user selection of a selectable commit element displayed in the frontend issue tracking application.

20. The method of claim 17 comprising:

prior to providing the frontend issue tracking application, authenticating first credentials provided by a user; and transmitting the issue view request with respect to second credentials for the frontend code application associated with the user.

* * * * *